United States Patent
Ajmera et al.

(10) Patent No.: US 11,847,482 B2
(45) Date of Patent: Dec. 19, 2023

(54) DISTRIBUTED RESOURCE SCHEDULER AS A SERVICE

(71) Applicant: VMWARE, INC., Palo Alto, CA (US)

(72) Inventors: Rahul Ajmera, Pune (IN); Amit Ratnapal Sangodkar, Pune (IN); Jivan Madtha, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 389 days.

(21) Appl. No.: 16/937,969

(22) Filed: Jul. 24, 2020

(65) Prior Publication Data

US 2021/0357244 A1    Nov. 18, 2021

(30) Foreign Application Priority Data

May 14, 2020    (IN) .............................. 202041020321

(51) Int. Cl.
| | | |
|---|---|---|
| *G06F 9/455* | (2018.01) | |
| *G06F 9/50* | (2006.01) | |
| *G06F 9/48* | (2006.01) | |

(52) U.S. Cl.
CPC ........ *G06F 9/45558* (2013.01); *G06F 9/4881* (2013.01); *G06F 9/5083* (2013.01);
(Continued)

(58) Field of Classification Search
CPC .. G06F 9/45558; G06F 9/4881; G06F 9/5083; G06F 2009/4557; G06F 2009/45595
See application file for complete search history.

(56) References Cited

U.S. PATENT DOCUMENTS

| | | | |
|---|---|---|---|
| 11,385,920 B2* | 7/2022 | Featonby | ............... G06F 9/5027 |
| 2007/0283314 A1* | 12/2007 | Browning | ........... G06F 11/1433 |
| | | | 717/100 |

(Continued)

OTHER PUBLICATIONS

Unknown author ("Running Hyper-V in a QEMU/KVM guest", Feb. 24, 2017, ladipro.wordpress.com/2017/02/24/running-hyperv-in-kvm-guest/) (Year: 2017).*

(Continued)

*Primary Examiner* — Lewis A Bullock, Jr.
*Assistant Examiner* — Kevin X Lu
(74) *Attorney, Agent, or Firm* — Clayton, McKay & Bailey, PC

(57) ABSTRACT

Methods and systems for balancing resources in a virtual machine computing environment are disclosed. A server can receive data illustrating the configuration of host machines and virtual machines in client computing environment. A simulated computing environment can be created that mirrors the configuration of the client computing environment. Data relating to resource usage (e.g., processor, memory, and storage) of the host machines can be received. The resource usage can be simulated in the simulated computing environment to mirror the usage of the client computing environment. A recommendation to execute a migration of a virtual machine can be received from the simulated computing environment. Instructions to execute a migration corresponding to the recommended migration can be generated and sent to the client computing environment.

17 Claims, 6 Drawing Sheets

(52) U.S. Cl.
CPC ............ *G06F 2009/4557* (2013.01); *G06F 2009/45595* (2013.01)

(56) References Cited

U.S. PATENT DOCUMENTS

| | | | |
|---|---|---|---|
| 2017/0255890 A1* | 9/2017 | Palavalli | G06Q 10/06 |
| 2019/0354392 A1* | 11/2019 | Chen | G06F 11/1484 |
| 2020/0310853 A1* | 10/2020 | Featonby | G06F 9/45558 |
| 2021/0149999 A1* | 5/2021 | Sharma | G06F 9/5066 |

OTHER PUBLICATIONS

Laurent Pouilloux, Takahiro Hirofuchi, Adrien Lebre. SimGrid VM: Virtual Machine Support for a Simulation Framework of Distributed Systems. IEEE Transactions on Cloud Computing, 2015, ff10.1109/TCC.2015.2481422ff. ffhal-01197274 (Year: 2015).*

Calheiros et al., "CloudSim: a toolkit for modeling and simulation of cloud computing environments and evaluation of resource provisioning algorithms", Softw. Pract. Exper. 2011: 41:23-50, Published online Aug. 24, 2010. (Year: 2010).*

* cited by examiner

DISTRIBUTED RESOURCE SCHEDULER AS A SERVICE

RELATED APPLICATIONS

Benefit is claimed under 35 U.S.C. 119(a)-(d) to Foreign Application Serial No. 202041020321 filed in India entitled "DISTRIBUTED RESOURCE SCHEDULER AS A SERVICE", on May 14, 2020, by VMware, Inc., which is herein incorporated in its entirety by reference for all purposes.

BACKGROUND

A distributed resource scheduler ("DRS") is a software application that can dynamically balance computing capacity across a collection of hardware resources. It can continuously monitor utilization across resource pools and intelligently allocate available resources among the virtual machines ("VMs") based on predefined rules that reflect business needs and changing priorities. When a VM experiences an increased load, a DRS can automatically allocate additional resources by redistributing VMs among the physical servers in the resource pool. Some DRSs can also optimize power consumption during periods of reduced demand.

Redistributing virtual resources can require interaction with a hypervisor platform on which the virtual resources run. Various hypervisor platforms exist, including ESX, KVM, XEN, and HYPER-V for example. One problem with DRSs is that they are hypervisor specific, so a DRS built for one hypervisor often cannot work with any other hypervisor. Additionally, not all DRSs provide the same services. For example, some DRSs do not provide power consumption optimization. This can be problematic if two services are needed that are not provided by the same DRS, or if a VM computing environment runs a hypervisor platform that does not have a DRS available with a needed service.

As a result, a need exists for a tool that can provide services for a DRS to multiple hypervisor platforms, particularly hypervisor platforms that are incompatible with or don't support the DRS.

SUMMARY

Examples described herein include systems and methods for providing a DRS as a service in a VM computing environment that can function across multiple hypervisor platforms. In an example method, a server can receive host configuration data from a client computing environment. The client computing environment (hereinafter referred to as "client environment") can include VMs and host machines that host the VMs. The host configuration data can include the number and type of host machines and VMs in the client environment. The host configuration data can also indicate the operating systems running on the VMs and hypervisors running on the host machines.

The server can create a simulated computing environment (hereinafter referred to as the "simulated environment") that mirrors the configuration of the client environment. The server can also provide a DRS that is compatible with the hypervisor platform of the simulated environment, but not with the hypervisor of the client environment. When the DRS recommends a resource allocation change in the simulated environment, that change can be executed in the client environment. Likewise, changes to the client environment can be synchronized to the simulated environment so the DRS can continue making decisions based on the current client environment conditions.

In more detail, a host machine and VM in the simulated environment can map to a specific host machine or VM in the client environment. In an example, the client environment and simulated environment can utilize different hypervisor platforms. The server can store a table that contains the mappings. For example, the client environment and simulated environment can both have two host machines. A designated first client host machine can map to a designated first simulated host machine, and likewise a second client host machine to a second simulated host machine. The same can be done for VMs installed on the host machines.

In an example, the server can also provide a DRS agent to the client environment that is compatible with the client environment's hypervisor platform. The DRS agent can gather resource usage data relating to the host machines and VMs in the client environment and pass that information to the server. The server can then cause the hypervisor of the simulated environment to make the changes so that the resource usage of the simulated environment mirrors that of the client environment. Likewise, when the DRS recommends changes to the simulated environment, the server can send commands to the DRS agent to implement the same changes, such as VM migrations, with the hypervisor in the client environment. This can allow for the two environments to remain synchronized.

The resource usage data sent from the DRS agent to the server can relate to a host or VM, such as information about a processor, memory, or storage, for example. The server can use the mapping table to map the resource usage to corresponding simulated host machines and VMs. The server can also simulate the client resource usage in the simulated environment. The simulation can include causing the processor, memory, and storage levels to mirror the client environment using the resource usage data, as an example. Using the mapped environments, the server can cause the processor, memory, and storage levels of the first simulated host machine to reflect that of the first client host machine, and likewise for the second simulated host machine to the second client host machine. The server can also simulate such resource usage for corresponding VMs. In some examples, the resource usage data can include indications of a host machine or VM being added or removed in the client environment. The server can then add or remove a corresponding host machine or VM depending on the instructions.

The server can receive a recommendation from the DRS to migrate a VM. For example, the DRS can monitor the resource usage levels in the simulated environment and, using predetermined algorithms, generate recommendations for migrating VMs on the simulated host machines to balance the resources of the host machines. The server can also regularly query the DRS for these recommendations. An example of a recommendation can be to migrate a VM from one host machine to another.

The server can use the recommendation to provide instructions to the client environment to execute the migration on the corresponding host machines. In an example, the server can generate these instructions by checking the mapping table to determine which client VM should be migrated and which client host machines should be involved. The server can send those instructions to the DRS agent in the client environment. The DRS agent can then instruct the client environment to execute the migration.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Described herein are examples of methods and systems for providing a DRS as a service. A server can receive data illustrating the configuration of host machines and virtual machines in client computing environment. The server can create a simulated computing environment that mirrors the configuration of the client computing environment. The server can receive data relating to resource usage (e.g., processor, memory, and storage) of host machines in the client environment. The resource usage can be simulated in the simulated computing environment to mirror the usage of the client computing environment. The server can receive a recommendation to execute a migration of a virtual machine from the simulated computing environment. The server can generate and provide instructions to the client computing environment to execute a migration corresponding to the recommended migration.

Figure 1:
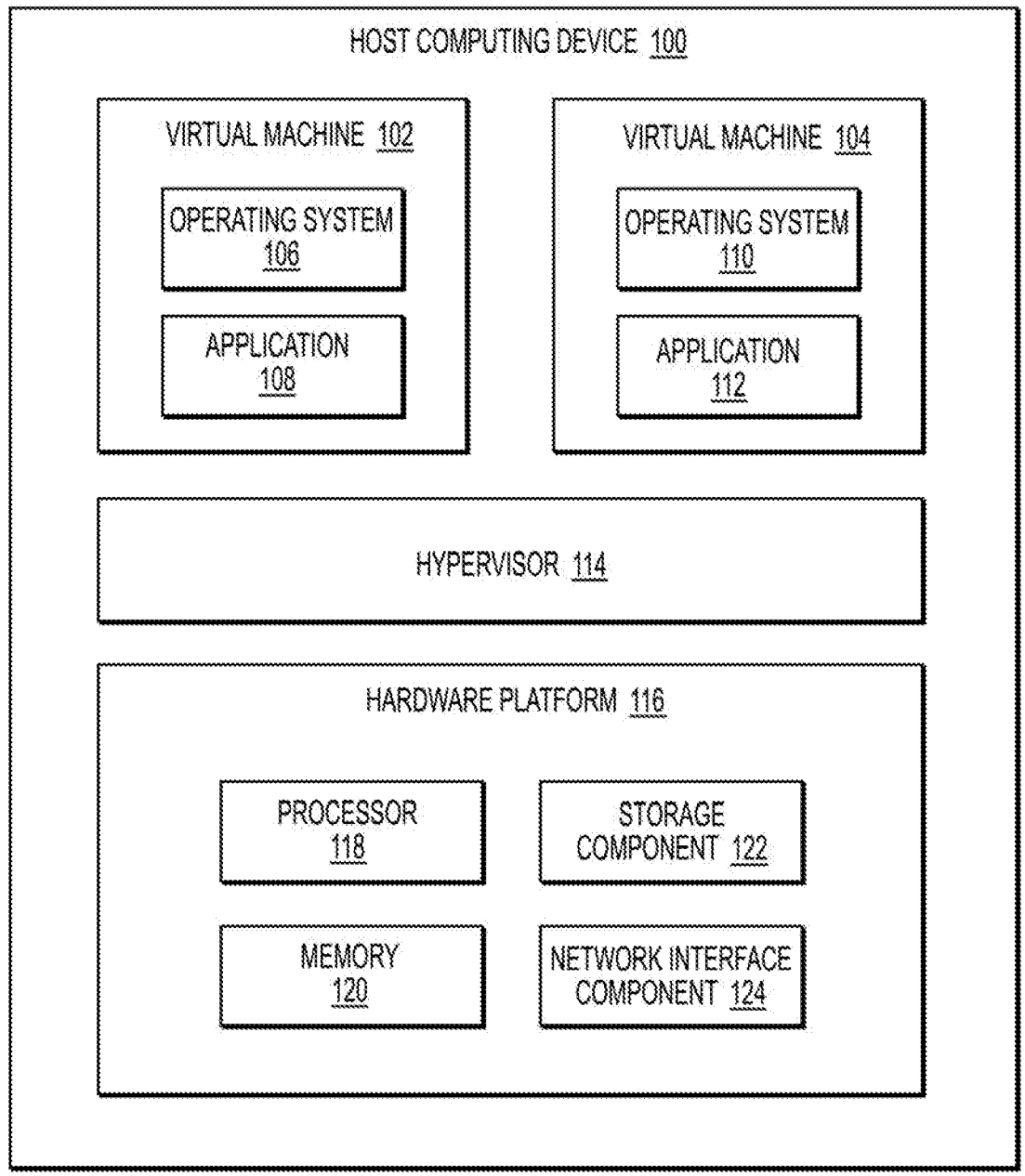
FIG. 1 is an illustration of an example host computing device in a VM computing environment.

FIG. 1 is an illustration of a host computing device 100 (hereinafter referred to as "host machine 100") in a VM computing environment. Host machine 100 can be, as an example, a physical computing device, such as a server, that is configured to house VMs, such as VMs 102 and 104. Host machine 100 can include VMs 102 and 104, a hypervisor 114, and a hardware platform 116.

VMs 102 and 104 can be any type of VM, that is, computer files that run on and behave like a physical computing device but are not confined to a physical computing device. Each of VMs 102 and 104 can have its own operating system ("OS") and application. For example, VM 102 can include an operating system 106, and VM 104 can include an operating system 110. Operating systems 106 and 110 can operate independent of each other. For example, operating system 106 can be a LINUX-based OS and operating system 110 can be a WINDOWS based OS. Other example OS types can include UNIX and MAC OS. Regardless of their OS type, operating systems 106 and 110 can operate independently on host machine 100 while sharing the computing resources of host machine 100. Each of operating system 106 and 110 can have an application installed thereon. For example, operating system 106 can include application 108 and operating system 210 can include application 112.

Hypervisor 114 can be firmware or software on host machine 100 that creates, runs, and manages VMs. For example, hypervisor 114 can create the virtual operating platform on which VMs 102 and 104 operate and manage the execution of their respective OSs on host machine 100. For example, hardware platform 116 can include physical computing resources like a processor 118, a memory 120, a storage component 122, such as a hard drive, and a network interface component 124. Hypervisor 114 can manage allocation of these resources to applications 108 and 112.

In some examples, host machine 100 can host additional VMs. In other examples, a VM, like VM 102, can be distributed across multiple host machines. For example, a second host machine can include a hypervisor that communicates with hypervisor 114. Host machine 100 and the second host machine can each host a portion of VM 102 and possibly portions of other VMs as well. The hypervisors on the two host machines can communicate with each other to pool the physical resources of both host machines and manage their usage depending on the needs of the VMs they host.

Figure 2:
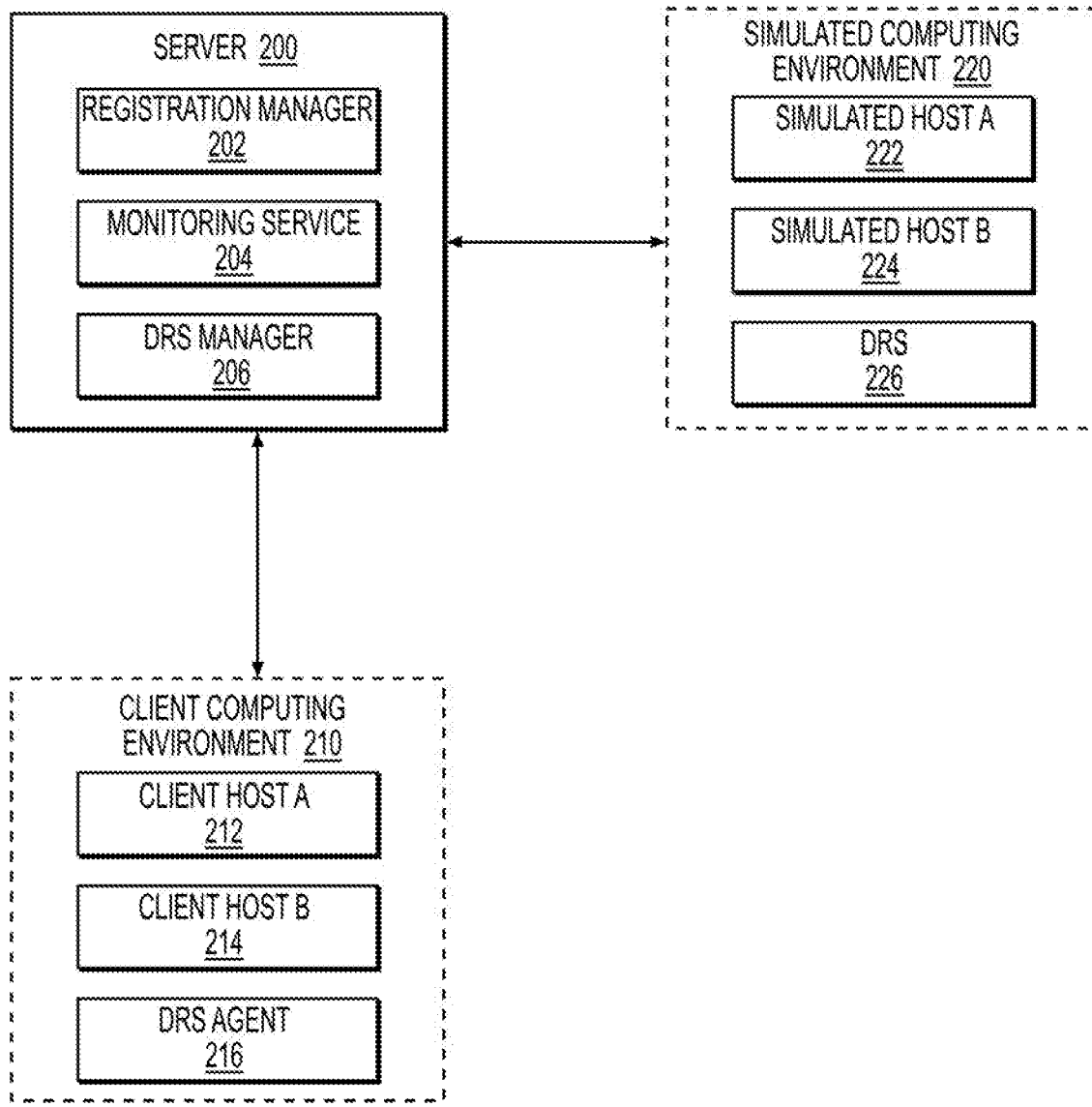
FIG. 2 is an illustration of a system for providing a DRS as a service in a VM computing environment.

FIG. 2 is an illustration of a system for providing a DRS as a service in a VM computing environment. Example components of the system can include a server 200, a client computing environment 210 (hereinafter "client environment 210"), and a simulated computing environment 220 (hereinafter "simulated environment 220"). Server 200 can be a single server or a group of servers, including multiple servers implemented virtually across multiple computing platforms. In an example, server 200 can be a server in an enterprise environment for an organization.

Server 200 can be configured to register client computing environments and manage their resources, such as client environment 210. For example, server 200 can include a registration manager 202 that is responsible for registering client computing environments, such as client computing environment 210. Server 200 can also include a monitoring service 204 that is responsible for receiving resource usage data from a client computing environment and sending the resource usage data to a simulated computing environment, like simulated computing environment 220.

Client environment 210 can be a computing environment configured to host VMs. For example, client environment 210 can include one or a cluster of host machines, such as client host A 212 and client host B 214, that host VMs. Client hosts A 212 and B 214 can be host machines like host machine 100 from FIG. 1, as an example. Client environment 210 can also include resource DRS agent 216.

Simulated environment 220 can be a computing environment that emulates client environment 210. As an example, simulated environment 220 can include the same number of host machines as client environment 210. For example, if client environment 210 includes client host A 212 and client host B 214, then simulated environment 220 can include simulated host A 222 and simulated host B 224. The simulated hosts can be mapped to the client hosts, and this data can be stored in server 200. For example, simulated host A 222 can be mapped to client host A 212, and simulated host B 224 can be mapped to client host B 214. All VMs in simulated environment 220 can be mapped to their corresponding VMs in client environment 210. Simulated environment 220 can also include DRS module 226.

Server 200 can also include a DRS manager 206 that communicates with a DRS agent 216 in client environment 210 and a DRS module 226 in simulated environment 220. DRS manager 206, DRS agent 216, and DRS module 226 (hereinafter referred to collectively as "Resource Scheduler Components") can work in conjunction with monitoring service 204 to dynamically manage VM migrations in client environment 210 using the methods described below.

DRS module 226 can be a set of executable scripts responsible for continuously monitoring computing resource usage (i.e., processor, memory, and storage usage of host machines) by VMs in simulated environment 220. DRS module 226 can also generate recommendations for reallocating the computing resources based on predefined rules. For example, when a VM experiences an increased load, DRS module 226 can generate a recommendation to redistributed VMs among the simulated hosts in simulated environment 220.

DRS agent 216 can be a set of executable scripts responsible for monitoring computing resource usage of VMs in client environment 210. DRS agent 216 can also report the resource usage to monitoring agent 204. Additionally, DRS agent 216 can be configured to receive and execute commands from DRS manager 206 to migrate VMs across different host machines in client environment 210.

DRS manager 206 can be responsible for handling VM migration recommendations from DRS module 226. For example, DRS manager 206 can have access to the data mapping simulated hosts and VMs to client hosts and VMs. In defined intervals, DRS manager 206 can query DRS module 226 for VM migration recommendations. In instances where DRS module 226 responds with a recommended migration, server 200 can check the mapping data to retrieve the corresponding VMs and host machines that need to take part in the migration. DRS manager 206 can then send instructions to DRS agent 216 to execute the recommended migration on the corresponding VMs and host machines.

In an example, DRS module 226 can be compatible with the hypervisor platform of simulated environment 220, but not of client environment 210. As a result, DRS may not be able to properly function within client environment 210 as a standalone service. For example, compatibility conflict may be similar to a how an application written for a MAC OS cannot be installed on or function in a WINDOWS OS. As a result, DRS module 226 cannot be installed in client environment 210, thus denying client environment 210 of the services DRS module 226 can provide. DRS agent 216 can bridge the incompatibility barrier by providing DRS module 226 with the information needed to balance computing resources. Example methods for how DRS module 226 services can be provided to an incompatible hypervisor platform through DRS agent 216 are provided in further detail herein, starting with FIG. 3 below.

Figure 3:
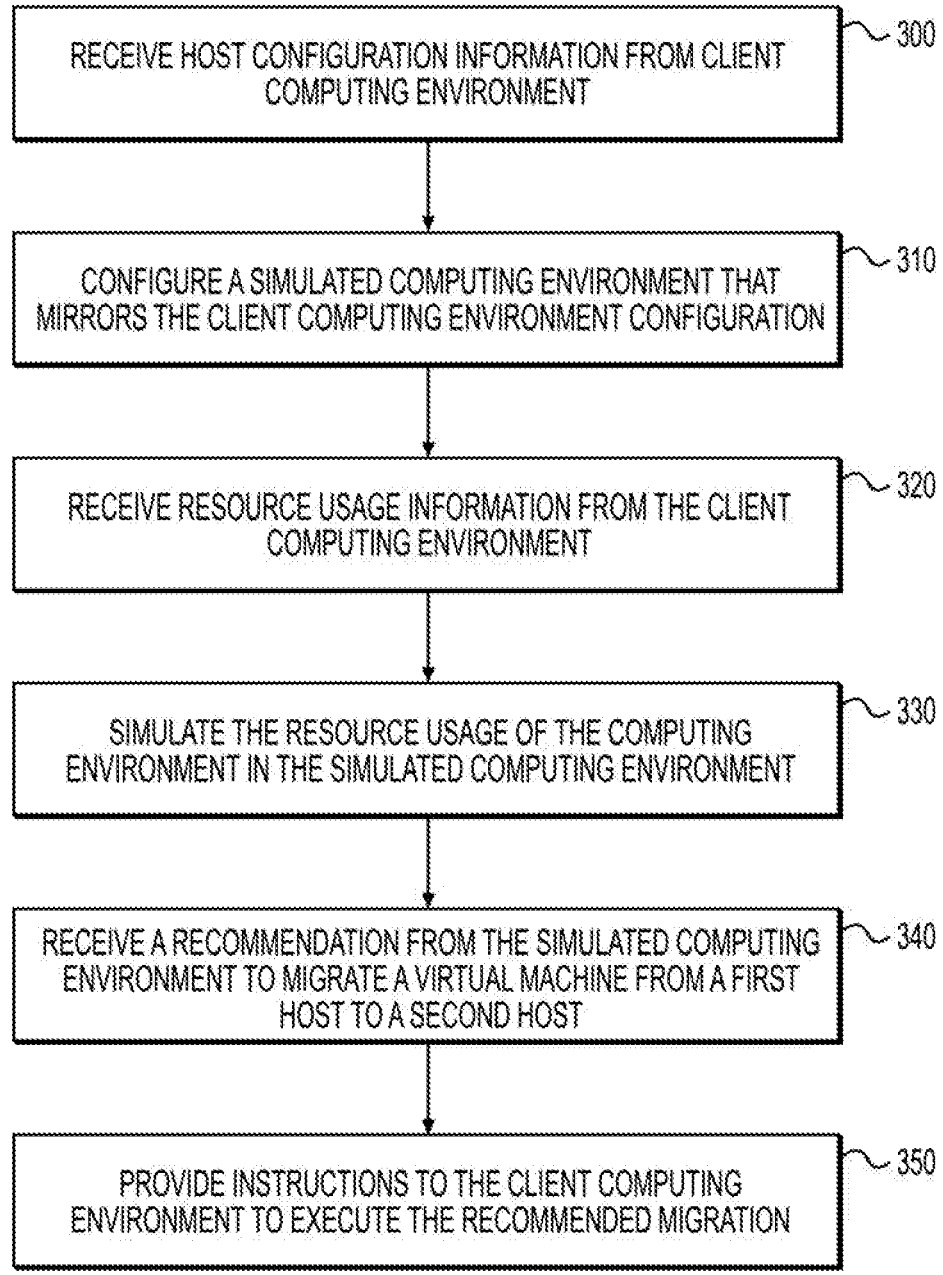
FIG. 3 is a flowchart of an example method for providing a DRS as a service.

FIG. 3 is a flowchart of an example method for providing a DRS as a service. At stage 300, server 200 can receive host configuration data from client environment 210. Host configuration data can include, for example, the number and types of host machines, the hypervisor running on the machines, the VMs distributed to each of the host machines, and the available resources on the host machines. In an example, the host configuration data can be gathered by DRS agent 216 installed previously on at least one host machine in client environment 210. DRS agent 216 can be a provided to client environment 210 by server 200 prior to receiving the host configuration data, in an example.

In some examples, the client environment and simulated environment can utilize different hypervisor platforms, so long as DRS agent 216 is compatible with the client hypervisor platform. For example, where DRS agent 216 is configured to operate on a KVM hypervisor, client environment 210 can operate using a KVM hypervisor and simulated environment 220 can operate using an ESX hypervisor. In this example, server 200 can provide DRS agent 216 to client environment 210 as an executable software package configured to install on machines utilizing a KVM hypervisor. DRS agent 216 can be installed and operate on any hypervisor for which it has been programmed.

At stage 310, server 200 can configure simulated environment 220. Configuring simulated environment 220 can include creating simulated environment 220 and using the host configuration data to configure it so that simulated environment 220 mirrors client environment 210. Server 200 can also map the components of simulated environment 220 to the corresponding components of client environment 210. For example, if the host configuration data indicates that client environment 210 includes three host machines, then server 200 can create simulated environment 220 with three host comparable machines where each host machine in simulated environment 220 mapped to a host machine in client environment 210. To be able to do this, server 200 can have access to a pool of physical servers dedicated to host simulation.

In an example, the host configuration data indicates that client environment 210 includes client host A 212 and client host B 214. Accordingly, server 200 can communicate with two available servers to have them serve as simulated host A 222 and simulated host B 224. Server 200 can also map simulated host A 222 to client host A 212 and map simulated host B 224 to client host B 214. Server 200 can also cause VMs to be installed on the simulated hosts A 222 and B 224 according to the host configuration data. Additionally, server 200 can create an instance of DRS module 226 for simulated environment 220.

At stage 320, server 200 can receive resource usage data from client environment 210. Resource usage data can include, for example, usage data relating to the processor, memory, storage, and network interface. Resource usage data can also indicate when a new VM is created or an existing VM is deleted. As with stage 310, the resource usage data can be collected by DRS agent 216. In an example, the resource usage data can be collected and handled by monitoring service 204. In some examples, DRS agent 216 can transmit the resource usage data to monitoring service 204 after defined time intervals. In other examples, in addition to defined time intervals, DRS agent 216 can transmit the resource usage data after a defined event occurs, such as the creation or deletion of a VM in client computing environment 210. The resource usage data can be sent as XML or JSON files, for example.

At stage 330, server 200 can simulate the resource usage of client environment 210 in simulated environment 220. In an example, this can include causing the computing resource usage of simulated environment 220 to change to mirror that of client environment 210. In an example, this can be handled by monitoring service 204. While the computing resource usage is simulated in simulated environment 220, DRS module 226 can monitor the usage and generate VM reallocation recommendations. Because the simulated usage mirrors the client usage, recommendations generated by DRS module 226 would apply equally to both environments.

At stage 340, server 200 can receive a recommendation from simulated environment 220 to migrate a VM from a first host machine to a second host machine. For example, server 200 can receive a recommendation to migrate a VM from simulated host A 222 to simulated host B 224. The recommendation can be to migrate a VM off a host machine. For example, simulated environment 220 can include another simulated host in addition to simulated hosts A 222 and B 224, simulated environment 220 can be configured with a VM distributed across all three hosts. Server 200 can receive a recommendation to migrate the VM off just the additional simulated host so that the VM remains on simulated hosts A 222 and B 224.

In an example, DRS module 226 can function as a DRS for simulated environment 220. DRS module 226 can monitor and analyze resource usage on simulated hosts A 222 and B 224 and dynamically determine recommended resource reallocations based on predefined rules. DRS manager 206 on server 200 can periodically or regularly query DRS module 226 for recommended reallocations, which DRS module 226 can then provide.

At stage 350, server 200 can provide instructions to client environment 210 to execute the recommended migration. The instructions can include the recommended reallocation from stage 340 modified for client environment 210. As an example, server 200 can receive a recommendation to migrate a VM from simulated host A 222 to simulated host B 224. In this example, simulate host A 222 maps to client host A 212, and simulated host B 224 maps to client host B 214. Server 200 can store this mapping data. Upon receiving the recommended reallocation, server 200 can modify the recommended reallocation to create instructions for client environment 210 to migrate the VM from client host A 212 to client host B 214. In an example, DRS manager 206 can handle the reception, modification, and transmission of the reallocation recommendation.

Figure 4:
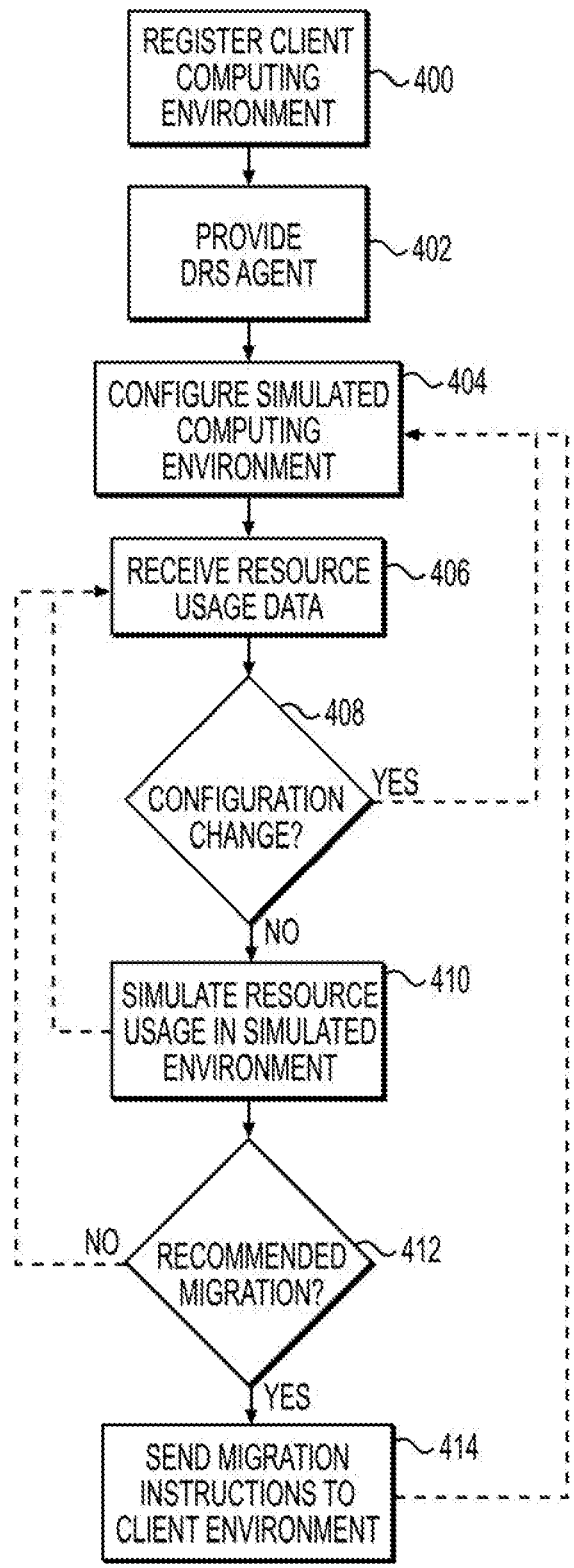
FIG. 4 is another flowchart of an example method for providing a DRS as a service.

FIG. 4 is a flowchart of an example method for continuously providing a DRS as a service. At stage 400, server 200 can register client environment 210. The registration can be handled by registration manager 202, for example. Registration manager 202 can receive a request from client environment 210 for a DRS service. In response to the request, at stage 402 registration manager 202 can provide DRS agent 216 to client environment 210. As an example, registration manager can transmit DRS agent 216 as a software package that client environment 210 installs on its host machines.

In an example, the client environment and simulated environment can utilize different hypervisor platforms, so long as DRS agent 216 is configured to operate on the client hypervisor. Server 200 can provide client environment 210 with a software package of DRS agent 216 that corresponds to the hypervisor utilized by client environment 210. Once installed, DRS agent 216 can gather host configuration data relating to client environment 210 and transmit the host configuration data to registration manager 202.

At stage 404, server 200 can configure simulated environment 220. In an example, this can be handled by registration manager 202. Like stage 310 in FIG. 3, configuring simulated environment 220 can include creating simulated environment 220 and using the host configuration data to configure it so that simulated environment 220 mirrors client environment 210, for example. Server 200 can also map the components of simulated environment 220 to the corresponding components of client environment 210. For example, if the host configuration data indicates that client environment 210 includes three host machines, then server 200 can create simulated environment 200 with three host comparable machines where each host machine in simulated environment 220 mapped to a host machine in client environment 210.

In an example, the host configuration data indicates that client environment 210 includes client host A 212 and client host B 214. Accordingly, server 200 can communicate with two available servers to have them serve as simulated host A 222 and simulated host B 224. Server 200 can also map simulated host A 222 to client host A 212 and map simulated host B 224 to client host B 214. Server 200 can also cause VMs to be installed on the simulated hosts A 222 and B 224 according to the host configuration data. Additionally, server 200 can create an instance of DRS module 226 for simulated environment 220.

At stage 406, server 200 can receive resource usage data from client environment 210. Like stage 320 in FIG. 3, resource usage data can include, for example, usage data relating to the processor, memory, storage, and network interface. Resource usage data can also indicate when a new VM is created or an existing VM is deleted. In an example, the resource usage data can be collected by DRS agent 216. In another example, the resource usage data can be collected and handled by monitoring service 204. In some examples, DRS agent 216 can transmit the resource usage data to monitoring service 204 after defined time intervals. In other examples, in addition to defined time intervals, DRS agent 216 can transmit the resource usage data after a defined event occurs, such as the creation or deletion of a VM in client computing environment 210. The data can be sent as XML or JSON files, for example.

At stage 408, server 200 check for a configuration change in client environment 210. For example, the resource usage data can indicate a host reconfiguration in client environment 210. As an example, the resource usage data can indicate that a host machine or VM has been added or removed from client environment 210. When this occurs, simulated environment 220 needs to be updated to reflect the change. In an example, the owner of client environment 210 can add an additional host machine or VM to client environment 210. DRS agent 216 can detect the change and inform monitoring service 204. In response, the method can return to stage 404, where monitoring service 204 can provide configuration instructions to simulated environment 220 so that simulated environment 220 continues to mirror client environment 210. Where no configuration change is detected, server 200 can simply continue to stage 410.

Stages 410, 412, and 414 are substantially similar to stages 330, 340, and 350 of FIG. 3 respectively. At stage 410, server 200 can simulate the resource usage of client environment 210 in simulated environment 220. At stage 412, server 200 can query simulated environment 220 for VM migration recommendations. Where server 200 receives a recommendation from simulated environment 220, such as a recommendation to migrate a VM from a first host machine to a second host machine, server 200 can continue to stage 414. At stage 414, server 200 can provide instructions to client environment 210 to execute the recommended migration. Where no recommendation is received, server 200 can return to stage 406 and receive more resource usage data.

As shown in FIG. 4, server 400 can continuously cycle between stages 406 and 410. For example, server 200 can receive resource usage data at defined intervals from client environment 210. Upon receiving the resource usage data, server 200 can update simulated environment 220 to mirror the resource usage of client environment 210. Server 200 can continuously update the resource usage of simulated environment 220 as it receives resource usage data from client environment 210. Similarly, as shown in FIG. 4, in instances where server 200 receives a recommendation to migrate a virtual machine in simulated environment 220 in stage 412, server 200 can provide the corresponding migration instructions to client environment 210 in stage 414, and then the method can return to stage 406 where server 200 can continue to receive resource usage data.

Figure 5:
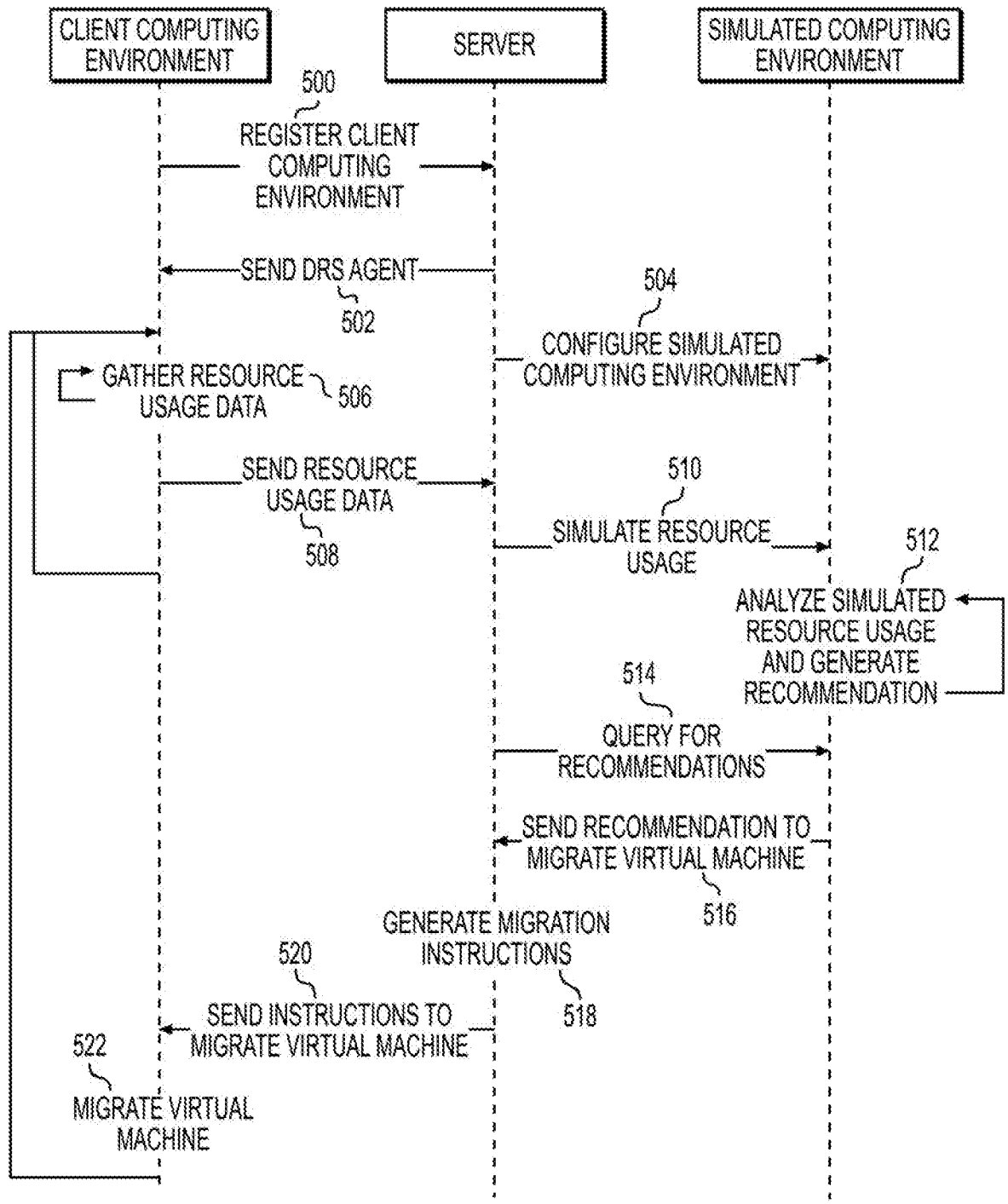
FIG. 5 is a sequence diagram of an example method for providing a DRS as a service.

FIG. 5 is a sequence diagram of an example method for providing a DRS as a service. In FIG. 5, "Client Computing Environment" can correspond to client environment 210 and its associated components, "Server" can correspond to server 200 and its associated components, and "Simulated Computing Environment" can correspond to simulated environment 220 and its associated components. At stage 500, client environment 210 can register with server 200. For example, server 200 can receive a request from client environment 210 for a DRS service. In response to the request, at stage 502 server 200 can provide DRS agent 216 to client environment 210. As an example, registration manager can transmit DRS agent 216 as a software package that client environment 210 installs on its host machines. Once installed, DRS agent 216 can gather host configuration data relating to client environment 210 and transmit the host configuration data to registration manager 202.

In an example, the client environment and simulated environment can utilize different hypervisor platforms, so long as DRS agent 216 is configured to operate on the client hypervisor. Server 200 can provide client environment 210 with a software package of DRS agent 216 that corresponds to the hypervisor utilized by client environment 210. Once installed, DRS agent 216 can gather host configuration data relating to client environment 210 and transmit the host configuration data to registration manager 202.

At stage 504, server 200 can configure simulated environment 220. Configuring simulated environment 220 can include creating simulated environment 220 and using the host configuration data to configure it so that simulated environment 220 mirrors client environment 210, for example. Server 200 can also map the components (i.e., host machines and VMs) of simulated environment 220 to the corresponding components of client environment 210.

At stage 506, DRS agent 216 can gather resource usage data related to client environment 210. Gathering resource usage data can include monitoring and creating logs of the resource usage of VMs in client environment 210, such as the amount or percentage of processing power, memory, and storage of host machines being used by each VM. In some examples, the resource usage data can include when a VM or host machine is added or removed from client environment 210. In an example, DRS agent 216 can gather this data continuously.

At stage 508, DRS agent 216 can send the resource usage data to server 200. In one example, DRS agent 216 can send the resource usage data in response to a query from server 200. In another example, DRS agent 216 can be configured to send the resource usage data to server in regular defined intervals. The data can be sent as XML or JSON files, for example.

At stage 510, server 200 can simulate the resource usage of client environment 210 in simulated environment 220. This can include causing the processor, memory, and storage usage levels of host machines in simulated environment 220 to change to mirror that of client environment 210. In an example, the resource usage levels of host machines in simulated environment 220 can be set to mirror the host machines in client environment 210 to which they are mapped. This can be done for VMs in both environments as well.

Stages 506, 508, and 510 can be executed repeatedly or continuously independent of other events taking place. For example, DRS agent 216 can continuously monitor and gather resource usage data of client environment 210. DRS agent 216 can also send resource usage data to server 200 at predetermined intervals. In some examples, DRS agent 216 can send the resource usage data in response to a query from server 200. In response to receiving the resource usage data, server 200 can simulate the resource usage in simulated environment 200. In an example, these steps can be repeatedly executed once client environment 210 is registered, has DRS agent 216 installed, and simulated environment 220 is created and configured.

At stage 512, simulated environment 220 can analyze the simulated resource usage and generate a recommendation. For example, DRS module 226 can monitor the usage and generate VM reallocation recommendations. A recommendation can include migrating a VM to or from a host machine, for example. Because the simulated usage mirrors the client usage, recommendations generated by DRS module 226 would apply equally to both environments. In an example, DRS agent 216 can continuously monitor the resource usage and store recommendations until the recommendations are sent to server 200.

At stage 514, server 200 can query simulated environment 220 for recommendations. This query can be made to DRS module 226. In an example, server 200 makes the query at regular intervals such as every few minutes. After receiving the query from server 200, at stage 516 DRS module 226 can send migrations recommendations to server 200. If there are no recommendations, DRS module 226 can respond indicating that no migration is needed. In one example, DRS module 226 can store recommendations in a queue where multiple recommendations are generated in between queries. After receiving a query and providing server 200 with the recommendations in the queue, DRS module 226 can clear the queue.

At stage 518, server 200 can generate migrations instructions. As an example, server 200 can store a mapping table that stores data mapping each host machine and VM in simulated environment 220 to a corresponding machine in client environment 210. Server 200 can compare the recommendation to the mapping table to generate migration instructions for client environment 210. The migration instructions can include instructions to execute a VM migration on the VMs and host machines to which the simulated VMs and host machines are mapped to. Then, at stage 520, server 200 can transmit the instructions to client environment 210. In an example, the instructions can be transmitted to DRS agent 216.

At stage 522, client environment 210 can execute the virtual machine migration according to the instructions. After client environment 210 migrates the VM, DRS agent 216 may perform stage 506 as part of its regular resource usage data gathering. The resource usage data can include the VM reconfiguration that resulted from the migration. At stage 508, the reconfiguration can be reported to server 200, and then at stage 510 server 200 can reconfigure simulated environment 220 to reflect the executed migration.

Figure 6:
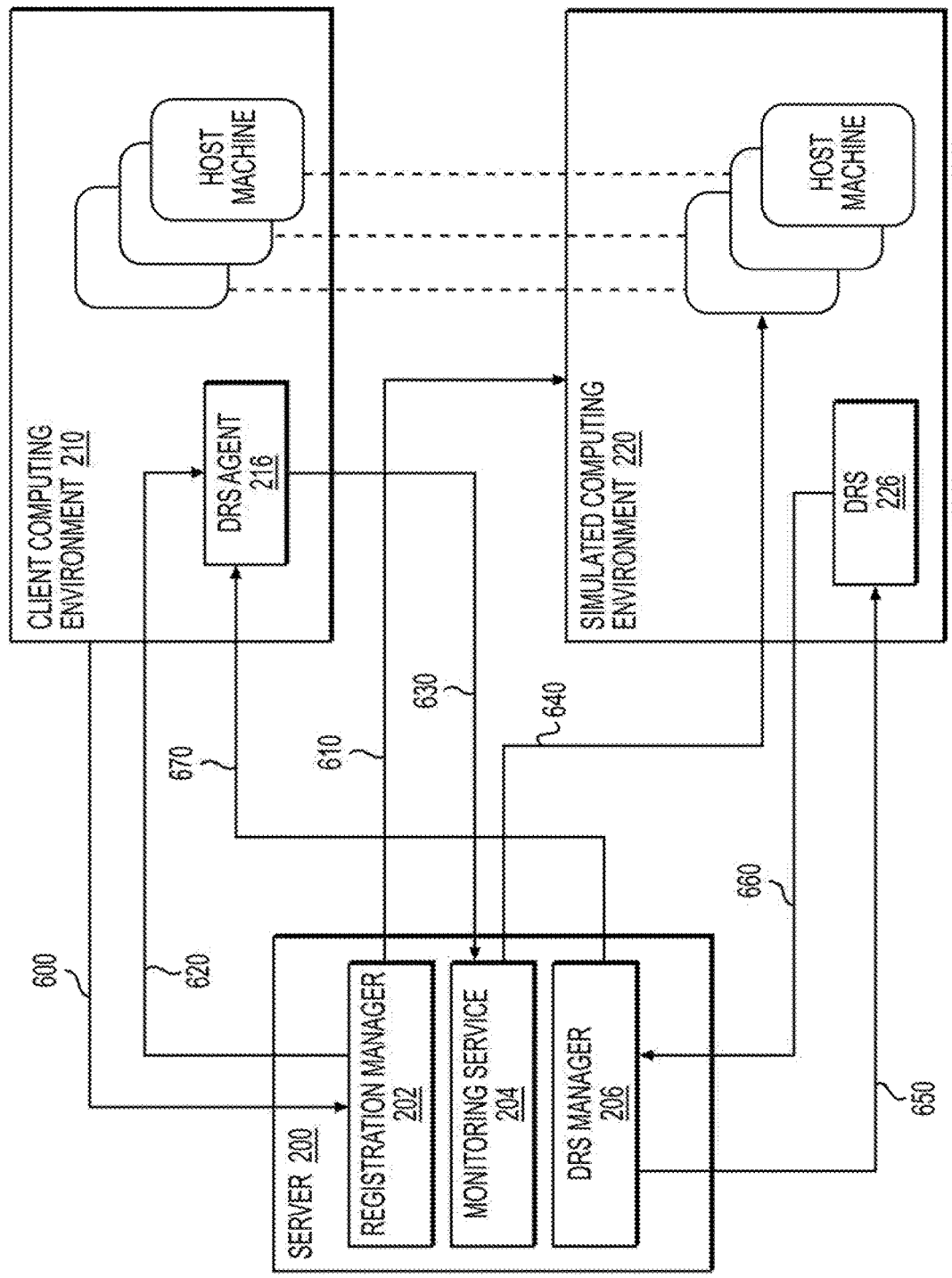
FIG. 6 is block diagram of an example method for providing a DRS as a service.

FIG. 6 is a block diagram of an example method for providing a DRS as a service that includes registration manager 202, monitoring service 204, resource manager 206, DRS agent 216, and DRS module 226. At stage 600, registration manager 202 can register client computing environment 210. As part of the registration process, client environment 210 can inform registration manager 202 how client environment 210 is configured, including, for example, the number of client hosts and how VMs are allocated across the client hosts.

At stage 610, registration manager 202 can create simulated environment 220 that mirrors client environment 210. Simulated environment 220 can include the same number of host machines as the same configuration of VMs across the host machines. In an example, registration manager 202 can also create a mapping table that stores data mapping each client host and VM to its corresponding simulated host and VM. Registration manager 202 can also install DRS module 226 on the host machines in simulated environment 220.

At stage 620, registration manager 202 can send DRS agent 216 to client environment 210. In an example, DRS agent 216 can be sent as a software package. Registration manager 202 can also send instructions to client environment 210 to install DRS agent 216 on all its host machines.

In an example, the client environment and simulated environment can utilize different hypervisor platforms, so long as DRS agent 216 is configured to operate on the client hypervisor. Server 200 can provide client environment 210 with a software package of DRS agent 216 the corresponds to the hypervisor utilized by client environment 210. Once installed, DRS agent 216 can gather host configuration data relating to client environment 210 and transmit the host configuration data to registration manager 202.

At stages 630 and 640, monitoring service 204 can handle monitoring and simulating client environment 210 resource usage. At stage 630, monitoring service 204 can receive resource usage data from DRS agent 216. For example, DRS agent 216 can collect usage data relating to the CPU, memory, and storage of host machines in client environment 210. DRS agent 216 can send the resource usage data to monitoring service 204 at regular intervals. At stage 640, monitoring service 204 can be responsible for simulating the resource usage of client environment 210 in simulated environment 220. As an example, the resource usage data can indicate how much processing power, memory, and storage each VM in client environment 210 uses and which machines their usage correspond to. Monitoring service 204 can use the mapping table to simulate the processing power, memory, and storage of the corresponding VMs and host machines in simulated environment 220. Monitoring agent 204 can continuously execute stages 630 and 640, or at regular intervals, despite of any other processes or method steps occurring.

At stages 650, 660, and 670, DRS manager 206 can handle VM migrations. DRS module 226 can continuously monitor simulated environment 220 and generate recommendations for VM migrations based on predetermined algorithms. At stage 650, DRS manager 206 can query DRS module 226 for any recommended VM migrations. In an example, DRS manager 206 can send such queries at regular intervals, such as every few minutes.

At stage 660, DRS module 226 can send any generated recommendations to DRS manager 206. If there are no recommendations, DRS module 226 can respond indicating that no migration is needed. In an example, DRS module 226 can store recommendations in a queue. After receiving a query, DRS module 226 can send all recommendations from the queue to DRS manager 206 and then clear the queue.

At stage 670, DRS manager 206 can send migration instructions to DRS agent 216. DRS manager 206 can generate the instructions based on the received recommendation. For example, DRS manager 206 can use the previously discussed mapping table to map each VM and host machine involved in the recommended migration. Using the mapped data, DRS manager 206 can convert the recommended migration for simulated environment 220 into migration instructions for the corresponding machines in client environment 210. Upon receiving the instructions, DRS agent 216 can instruct client environment 210 to execute the recommend migration.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing a distributed resource scheduler ("DRS") as a service in a virtual machine computing environment, comprising:
   creating a simulated computing environment that corresponds to host configuration data of a client computing environment, wherein the client computing environment includes a first hypervisor, and the simulated computing environment includes a second hypervisor that is different from the first hypervisor;
   receiving resource usage data from the client computing environment, the resource usage data having been gathered from a DRS agent running in the client computing environment;
   simulating, using the resource usage data, the client computing environment in the simulated computing environment, wherein the simulated computing environment includes a DRS that monitors computing resource usage of the simulated computing environment and is incompatible with the first hypervisor;
   receiving, by a DRS manager from the DRS, a recommendation to migrate a first virtual machine based on the simulation, the first virtual machine being in the simulated computing environment; and
   providing, by the DRS manager to the DRS agent, instructions to migrate a second virtual machine, the second virtual machine being in the client computing environment and corresponding to the first virtual machine, wherein the instructions are generated by comparing the received recommendation to a mapping table that stores data mapping each host machine and virtual machine in the simulated environment to a corresponding entity in the client computing environment, and wherein the DRS agent translates the instructions into a command that the first hypervisor implements in the client computing environment.

2. The method of claim 1, further comprising:
   receiving, from the client computing environment, a change to the resource usage data; and
   replicating the change in the simulated computing environment, wherein the DRS makes the recommendation to migrate the first virtual machine based on the change in the simulated computing environment.

3. The method of claim 1, wherein the client computing environment includes hosts and virtual machines, and wherein creating the simulated environment includes creating corresponding hosts and virtual machines, wherein simulating the resource usage includes causing the corresponding hosts and virtual machines of the simulated environment to reflect those of the client computing environment based on the host configuration data.

4. The method of claim 1, wherein simulating the resource usage in the simulated computing environment comprises simulating processor and memory usage of a second host in the simulated computing environment according to resource usage data relating to a first host in the client computing environment.

5. The method of claim 1, wherein the instructions to migrate the second virtual machine comprises instructions to transfer the second virtual machine from a first host computing device to a second host computing device.

6. The method of claim 1, further comprising providing a software package for the DRS agent to the client computing environment, the DRS agent software package being configured to gather the resource usage data.

7. A non-transitory, computer-readable medium containing instructions that, when executed by a hardware-based processor, performs stages for providing a distributed resource scheduler ("DRS") as a service in a virtual machine computing environment, the stages comprising:
   creating a simulated computing environment that corresponds to host configuration data of a client computing environment, wherein the client computing environment includes a first hypervisor, and the simulated computing environment includes a second hypervisor that is different from the first hypervisor;
   receiving resource usage data from the client computing environment, the resource usage data having been gathered from a DRS agent running in the client computing environment;
   simulating, using the resource usage data, the client computing environment in the simulated computing environment, wherein the simulated computing environment includes a DRS that is incompatible with the first hypervisor;
   receiving, by a DRS manager from the DRS, a recommendation to migrate a first virtual machine based on the simulation, the first virtual machine being in the simulated computing environment; and
   providing, by the DRS manager to the DRS agent, instructions to migrate a second virtual machine, the second virtual machine being in the client computing environment and corresponding to the first virtual machine, wherein the instructions are generated by comparing the received recommendation to a mapping table that stores data mapping each host machine and virtual machine in the simulated environment to a corresponding entity in the client computing environment, and wherein the DRS agent translates the instructions into a command that the first hypervisor implements in the client computing environment.

8. The non-transitory, computer-readable medium of claim 7, the instructions further comprising:
   receiving, from the client computing environment, a change to the resource usage data; and
   replicating the change in the simulated computing environment, wherein the DRS makes the recommendation to migrate the first virtual machine based on the change in the simulated computing environment.

9. The non-transitory, computer-readable medium of claim 7, wherein the client computing environment includes hosts and virtual machines, and wherein creating the simulated environment includes creating corresponding hosts and virtual machines, wherein simulating the resource usage includes causing the corresponding hosts and virtual machines of the simulated environment to reflect those of the client computing environment based on the host configuration data.

10. The non-transitory, computer-readable medium of claim 7, wherein simulating the resource usage in the simulated computing environment comprises simulating processor and memory usage a second host in the simulated computing environment according to resource usage data relating to a first host in the client computing environment.

11. The non-transitory, computer-readable medium of claim 7, wherein the instructions to migrate the second virtual machine comprises instructions to transfer the second virtual machine from a first host computing device to a second host computing device.

12. The non-transitory, computer-readable medium of claim 7, the instructions further comprising providing a software package for the DRS agent to the client computing environment, the DRS agent software package being configured to gather the resource usage data.

13. A system for providing a distributed resource scheduler ("DRS") as a service in a virtual machine computing environment, comprising:
   a memory storage including a non-transitory, computer-readable medium comprising instructions; and
   a computing device including a hardware-based processor that executes the instructions to carry out stages comprising:
      creating a simulated computing environment that corresponds to host configuration data of a client computing environment, wherein the client computing environment includes a first hypervisor, and the simulated computing environment includes a second hypervisor that is different from the first hypervisor;
      receiving resource usage data from the client computing environment, the resource usage data having been gathered from a DRS agent running in the client computing environment, wherein the DRS agent is configured to run on the first hypervisor;
      simulating, using the resource usage data, the client computing environment in the simulated computing environment, wherein the simulated computing environment includes a DRS that is incompatible with the first hypervisor and configured to run on the second hypervisor;
      receiving, by a DRS manager from the DRS, a recommendation to migrate a first virtual machine based on the simulation, the first virtual machine being in the simulated computing environment; and
      providing, by the DRS manager to the DRS agent, instructions to migrate a second virtual machine, the second virtual machine being in the client computing environment and corresponding to the first virtual machine, wherein the instructions are generated by comparing the received recommendation to a mapping table that stores data mapping each host machine and virtual machine in the simulated environment to a corresponding entity in the client computing environment, and wherein the DRS agent translates the instructions into a command that the first hypervisor implements in the client computing environment.

14. The system of claim 13, the instructions further comprising:
- receiving, from the client computing environment, a change to the resource usage data; and
- replicating the change in the simulated computing environment, wherein the DRS makes the recommendation to migrate the first virtual machine based on the change in the simulated computing environment.

15. The system of claim 13, wherein the client computing environment includes hosts and virtual machines, and wherein creating the simulated environment includes creating corresponding hosts and virtual machines, wherein simulating the resource usage includes causing the corresponding hosts and virtual machines of the simulated environment to reflect those of the client computing environment based on the host configuration data.

16. The system of claim 13, wherein simulating the resource usage in the simulated computing environment comprises simulating processor and memory usage a second host in the simulated computing environment according to resource usage data relating to a first host in the client computing environment.

17. The system of claim 13, further comprising providing a software package for the DRS agent to the client computing environment, the DRS agent software package being configured to gather the resource usage data.

* * * * *